US011643520B2

(12) United States Patent
Zerafati et al.

(10) Patent No.: US 11,643,520 B2
(45) Date of Patent: May 9, 2023

(54) LOW DENSITY FLUOROPOLYMER FOAM

(71) Applicant: Arkema Inc., King of Prussia, PA (US)

(72) Inventors: Saeid Zerafati, Villanova, PA (US);
Ronald H. Partridge, Royersford, PA (US)

(73) Assignee: Arkema Inc., King of Prussia, PA (US)

( * ) Notice: Subject to any disclaimer, the term of this patent is extended or adjusted under 35 U.S.C. 154(b) by 341 days.

(21) Appl. No.: 16/645,131

(22) PCT Filed: Sep. 5, 2018

(86) PCT No.: PCT/US2018/049502
§ 371 (c)(1),
(2) Date: Mar. 6, 2020

(87) PCT Pub. No.: WO2019/050915
PCT Pub. Date: Mar. 14, 2019

(65) Prior Publication Data
US 2021/0163704 A1    Jun. 3, 2021

Related U.S. Application Data

(60) Provisional application No. 62/555,764, filed on Sep. 8, 2017.

(51) Int. Cl.
    *C08J 9/32*      (2006.01)
    *B29C 48/40*     (2019.01)
    *B29K 105/16*    (2006.01)

(52) U.S. Cl.
    CPC ............ *C08J 9/32* (2013.01); *B29C 48/40* (2019.02); *B29K 2105/165* (2013.01); *C08J 2201/024* (2013.01); *C08J 2201/03* (2013.01); *C08J 2203/22* (2013.01); *C08J 2207/06* (2013.01); *C08J 2327/16* (2013.01); *C08J 2433/08* (2013.01)

(58) Field of Classification Search
    CPC .... C08J 9/32; C08J 2201/024; C08J 2201/03; C08J 2203/22; C08J 2207/06; C08J 2327/16; C08J 2433/08; C08J 2207/00; C08J 2207/10; C08J 3/226; C08J 5/12; C08J 9/228; B29C 48/40; B29C 44/42; B29C 48/0012; B29K 2105/165; C08L 27/16
    See application file for complete search history.

(56) References Cited

U.S. PATENT DOCUMENTS

| | | |
|---|---|---|
| 3,615,972 A | 10/1971 | Morehouse, Jr. et al. |
| 4,781,433 A | 11/1988 | Arroyo et al. |
| 2001/0051666 A1 | 12/2001 | Kron et al. |
| 2003/0077455 A1 | 4/2003 | Amin-Sanayei et al. |
| 2004/0197545 A1 | 10/2004 | Gehlsen et al. |
| 2005/0031811 A1 | 2/2005 | Mehan et al. |
| 2005/0079352 A1 | 4/2005 | Glorioso et al. |
| 2010/0119748 A1 | 5/2010 | Henry et al. |
| 2010/0249255 A1 | 9/2010 | Jacobs et al. |
| 2012/0045603 A1 | 2/2012 | Zerafati et al. |
| 2015/0322226 A1 | 11/2015 | Nordin |
| 2016/0101932 A1 | 4/2016 | Stabler et al. |

FOREIGN PATENT DOCUMENTS

WO    2017112724 A1    6/2017

*Primary Examiner* — Irina S Zemel
(74) *Attorney, Agent, or Firm* — Joanne Rossi

(57) ABSTRACT

The invention relates to low density fluoropolymer foam, and preferably polyvinylidene fluoride (PVDF) foam, such as that made with KYNAR PVDF resins, and articles made of the foam. The foam is produced by adding microspheres containing blowing agents to the polymer and processing it through an extruder. The microspheres consist of a hard shell containing a physical blowing agent. The shell softens at elevated temperatures and allows the expansion of the blowing agent, and microsphere to create larger voids within the polymer matrix. By proper control of the polymer composition, viscosity, processing temperature, blowing agent selection, loading ratio, and finishing conditions, useful articles such as foamed PVDF pipe, tube, profiles, film, wire jacketing and other articles can be produced. The microspheres may be added to the fluoropolymer matrix by several means, including as part of a masterbatch with a compatible polymer carrier.

12 Claims, 1 Drawing Sheet

LOW DENSITY FLUOROPOLYMER FOAM

This present application is the national phase under 35 USC § 371 of prior PCT International Application Number PCT/US2018/049502 filed Sep. 5, 2018 which designated the United States of America and claimed priority to U.S. Provisional Patent Application Ser. No. 62/555,764 filed Sep. 8, 2017.

FIELD OF THE INVENTION

The invention relates to low density fluoropolymer foam, and preferably polyvinylidene fluoride (PVDF) foam, and articles made of the foam. The foam is produced by adding microspheres containing blowing agents to the polymer and processing it through an extruder. The microspheres consist of a hard shell containing a physical blowing agent. The shell softens at elevated temperatures and allows the expansion of the blowing agent, and microsphere to create larger voids within the polymer matrix. By proper control of the polymer composition, viscosity, processing temperature, blowing agent selection, loading ratio, and finishing conditions, useful articles such as foamed PVDF pipe, tube, profiles, film, wire jacketing and other articles can be produced. The microspheres may be added to the fluoropolymer matrix by several means, including as part of a masterbatch with a compatible polymer carrier.

BACKGROUND OF THE INVENTION

Fluoropolymers, and polyvinylidene fluoride in particular, possess many favorable physical properties that make them the material of choice in many applications. Polyvinylidene fluoride (PVDF) has a marked toughness and high elasticity, and has a high chemical, weathering, permeation and flammability resistance. It is widely used in both coating and melt-processable applications. PVDF resins can be used in most thermoforming processes to make articles, including but not limited to molded parts, extruded profiles, and films.

Unfortunately PVDF has a relatively high density, and can be more expensive than many of the commodity polymer resins.

There is a desire to reduce the density and reduce the cost of PVDF, with little or no decrease in its excellent physical and chemical properties.

One method to reduce the density of PVDF is through formation of a PVDF foam. Unfortunately, poor melt strength and difficulty in controlling the cell formation in the molten state has generally limited the foaming of PVDF to either a batch process, foaming with support, or some exotic process such as latex freezing. In the batch process, solid PVDF is formed first, typically into a film through extrusion, cross linked through radiation, soaked in a gas under pressure for extended amount of time and then foamed at higher temperature typically into a slab. It is impossible to make hollow or long articles, such as pipes, with solid skins using this method. In the supported foam technique, in order to overcome the poor melt strength, foamed polymer is extruded on or around a carrier or wire to prevent it from collapsing. The foam extruded in this case would not be able to hold its own without the support of a carrier, especially in large size applications. Therefore, it is not possible to size the product or create a hollow freestanding profile. As the result, this technology is only limited to making PVDF wire coating.

U.S. Pat. No. 4,781,433 describes foamed PVDF jackets for fiber optical cable. The PVDF is formed using a blowing agent concentrate to produce an expanded PVDF that is extruded directly onto a moving wire. The PVDF foam is neither sized nor self-supporting.

U.S. Pat. No. 7,081,216 describes the formation of a PVDF foam by freezing a PVDF emulsion followed by thawing. This process is not useful for producing hollow or long and thin articles with solid skins.

WO 08/137393 describes foamed PVDF tubular articles useful as conduit. Sizing, melt viscosity and nucleating agents are not described One means to overcome the melt strength issue and reduce cost is to form a PVDF alloy with other polymers, such as acrylics in order to reduce the crystallinity and improve the foaming process. Such a blend would compromise the property advantages of a PVDF foam, which is mainly coming from the high crystallinity of the fluoropolymer. It is therefore highly desirable to make a PVDF foam without diluting its properties by addition of other polymers with inferior properties.

A PVDF self-supporting foam is described in US 2012-0045603, using a masterbatch with a chemical foaming agent, followed by a sizing operation.

Traditionally foamed polymers were generated using chemical or physical blowing agents. In the case of the chemical blowing agent, the gas is created by decomposition of a chemical material by heating it above its degradation temperature. In the case of the physical blowing agent, gas is introduced directly into the polymer matrix that is near or above its melting point. Either type of foaming agents can be used in both continuous or batch foaming processes although batch process mainly use physical blowing agents. Chemical blowing agents are mainly used for higher density foams—down to 50% density reduction, while physical blowing agents can produce light foams—upwards of 10× density reduction.

Recently a new means of foaming polymers has been developed, in the form of expandable microspheres. U.S. Pat. No. 7,879,441 describes a foam article prepared by adding expandable microspheres to an acrylate-insoluble polymer matrix in an extruder. The mixture may either be expanded in the extruder—producing a foamed article, or can remain relatively unexpanded, and foamed-in-place. The application is mainly for adhesive tapes. US 2015/0322226 also describes the use of microspheres for foaming polymers. Fluoropolymers are not included. It is known to be difficult to uniformly disperse most materials into a fluoropolymer matrix—including these microspheres.

It has now surprisingly been found that low density, fluoropolymer foam, and especially PVDF foam, can be formed using expandable microspheres. Through the proper choice of polymer viscosity, processing conditions, blowing agent loading, and sizing conditions foamed articles sized to final specifications can be obtained using a calibration process. The fluoropolymer and microspheres, alone or as part of a formulated masterbatch, can be effectively dispersed in a fluoropolymer matrix, and expanded during a continuous extrusion process, or in a post-article formation process. A masterbatch having a fluoropolymer-compatible carrier resin, provides a means to uniformly distribute the microspheres into the fluoropolymer to produce a foam with uniform distribution of cells and density.

The closed-cell foams formed by the invention surprisingly have a very smooth surface. Density reductions of up to 80 percent have been obtained. Though the microspheres contain organic liquids, foams formed by the invention are flame resistant.

In addition, it has surprisingly been found that both low and high viscosity fluoropolymers can be easily foamed with this same invention. "Injection molding" grade viscosity resins and "extrusion" grade viscosity resins can both be foamed using the technology of the invention. With physical foaming agents—only extrusion or "high melt strength" polymers can be foamed effectively. Lower viscosity grades result in large macrovoids or the foam collapsing after foaming.

Foamed articles can be formed easily without additional process aids or additives. Articles can be shaped using various forming devices or extruded onto carriers such as wire or metal pipes. The fluoropolymer foam of the invention has a low density, flame resistance and excellent insulating properties, in addition to the chemical resistance expected from the fluoropolymer, making it useful as pipes, tubes, profiles, jacketing films, corrugated pipes or similar articles in industries such as transportation, wire and cable, chemical manufacturing, aerospace, building and construction, and seals and gaskets.

In addition to producing low density foams, this technology is useful for producing articles having targeted properties that correlate with the density reduction achieved. The ability of this invention to produce a reproducible density reduction between 1 and 70% correlating directly with addition rate of the expandable microspheres allows the use of this technology to adjust physical and mechanical properties as needed for a particular application. The ability to target a density reduction is believed useful to adjust many properties including but not limited to flexural properties, tensile properties, impact properties, cut resistance (strippability), dielectric properties, permeation properties, and thermal properties.

SUMMARY OF THE INVENTION

The invention relates to low density fluoropolymer foam, processes for making the foam, and articles formed from the foam.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Aspects of the invention include:
1. A fluoropolymer foam structure comprising:
   60 to 99.9 weight percent fluoropolymer; and
   0.1 to 40 weight percent, preferably 0.5 to 30 weight percent, and more preferably 1 to 20 weight percent of residual expandable microspheres.
2. The fluoropolymer foam structure of aspect 1, wherein said fluoropolymer comprises at least 51 weight percent of vinylidene fluoride monomer units.
3. The fluoropolymer foam structure of either of aspects 1 and 2, wherein said microspheres have an acrylic shell that is compatible with said fluoropolymer.
4. The fluoropolymer foam structure of any of aspects 1 to 3, wherein said microspheres have an average particle size of 10 to 140 micron.
5. The fluoropolymer foam structure of any of aspects 1 to 4, further comprising one or more additives selected from the group consisting of impact modifiers, UV stabilizers, plasticizers, fillers, coloring agents, pigments, dyes, antioxidants, antistatic agents, surfactants, toner, pigments, and dispersing aids, char formers, and flame retardants
6. The fluoropolymer foam structure of any of aspects 1 to 5, wherein said fluoropolymer is a polyvinylidene fluoride copolymer having at least 70 weight percent of vinylidene fluoride monomer units and 0.1 to 30 weight percent of fluoromonomers units selected from the group consisting of vinyl fluoride, trifluoroethene, tetrafluoroethene, one or more of partly or fully fluorinated alpha-olefins, 3,3,3-trifluoro-1-propene, 1,2,3,3,3-pentafluoropropene, 3,3,3,4,4-pentafluoro-1-butene, and hexafluoropropene, hexafluoroisobutylene, perfluorinated vinyl ethers, perfluoromethyl vinyl ether, perfluoroethyl vinyl ether, perfluoro-n-propyl vinyl ether, perfluoro-2-propoxypropyl vinyl ether, fluorinated dioxoles, perfluoro(1,3-dioxole), perfluoro(2,2-dimethyl-1,3-dioxole), and fluorinated or partly fluorinated allylic monomers.
7. The fluoropolymer foam of any of aspects 1 to 6, wherein said foam has a density that is less than 75 percent, preferably less than 50 percent, preferably less than 35 percent, and even less than 25 percent less than the density of the unfoamed fluoropolymer.
8. A masterbatch for use in producing a fluoropolymer foam, wherein said masterbatch comprises 5 to 95 weight percent, and preferably 40 to 70 weight percent of foamable microspheres and 95 to 5 weight percent, and preferably 30 to 60 weight percent of a carrier resin, wherein said carrier resin is compatible with the fluoropolymer matrix.
9. The masterbatch of aspect 8, wherein said carrier resin is a polyvinylidene fluoride homopolymer or copolymer having a lower melt viscosity that is at least a factor of 5 times lower than the melt viscosity of the polyvinylidene fluoride matrix polymer to which it will be added, when measured at 232° C. and 100 sec$^{-1}$, as measured by capillary rheometry.
10. A continuous process for producing low-density fluoropolymer foam, comprising, in order, the steps of:
    a) optionally form one or more masterbatches of expandable microspheres in a carrier polymer;
    b) adding said microspheres and polyvinylidene fluoride resin into an extruder, optionally with pre-blending;
    c) mixing and processing the microsphere/PVDF blend in the extruder;
    d) extruding a PVDF foam from the extruder through one or more dies;
    e) processing and forming the PVDF foam;
    f) cutting the foam into final articles.
11. The process of aspect 10, wherein the level of microspheres and polyvinylidene fluoride in the extruder is from 0.1 to 30 weight percent, and preferably 1 to 20 weight percent of said microspheres, and 70 to 99.5, and preferably 80 to 99 weight percent of said polyvinylidene fluoride polymer as the matrix polymer.
12. The process of either of aspects 10 or 11, wherein, when the microspheres are part of a master batch, the masterbatch comprises 5 to 95 weight percent, and preferably 40 to 70 weight percent of foamable microspheres and 95 to 5 weight percent, and preferably 30 to 60 weight percent of a carrier resin.
13. The process of any or aspects 10 to 12, wherein said extruder is a twin screw extruder.
14. The process of any or aspects 10 to 13, wherein said forming step e) comprises a calibrator.
15. A non-continuous process for producing low-density fluoropolymer foam, comprising, in order, the steps of:
    a) optionally form one or more masterbatches of expandable microspheres in a carrier polymer;

b) adding said microspheres and polyvinylidene fluoride resin into an extruder, optionally with pre-blending;
c) mixing and processing the microsphere/PVDF blend in the extruder;
d) extruding a PVDF foam from the extruder into a mold;
e) allowing the foam to set up in the mold;
f) removing the molded article.

16. The process of claim 15, wherein said molding process is an injection molding or rotomolding process.

17. An article made of the fluoropolymer foam of any of aspects 1 to 7, or by the process of any of claims 10 to 16, wherein said article is for use in oil & gas, wire and cable, aerospace, transportation, chemical manufacturing, building and construction, beverage, medical, pharmaceutical or cosmetics industries.

18. The article of aspect 17, wherein said article is selected from the group consisting of: flame resistant insulation, jacketing for fiber optics, jacketing for wire and cable applications, microduct conduit, plenum conduits, chemical manufacturing equipment, tubing, piping, building and construction, gaskets, seals, thin foamed tough film, and chemical and flame-resistant tapes.

DETAILED DESCRIPTION OF THE INVENTION

Figure 1:
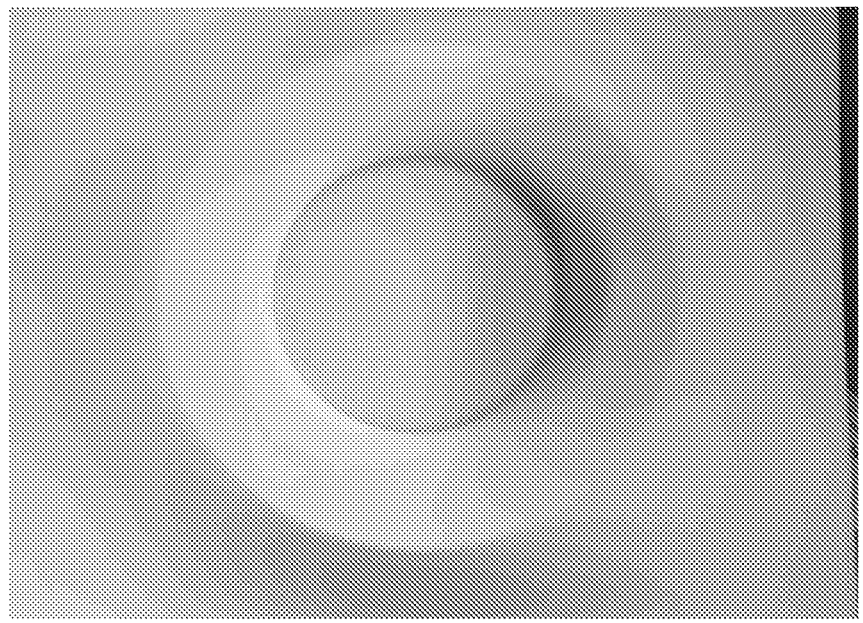
FIG. 1 Shows a thermoformed foam cup made of the foam of the invention.

"Copolymer" is used to mean a polymer having two or more different monomer units. "Polymer" is used to mean both homopolymer and copolymers. For example, as used herein, "PVDF" and "polyvinylidene fluoride" is used to connote both the homopolymer and copolymers, unless specifically noted otherwise. Polymers may be straight chain, branched, star, comb, block, or any other structure. The polymers may be homogeneous, heterogeneous, and may have a gradient distribution of co-monomer units. All references cited are incorporated herein by reference. As used herein, unless otherwise described, percent shall mean weight percent. Molecular weight is a weight average molecular weight as measured by gel permeation chromatography (GPC). In cases where the polymer contains some cross-linking, and GPC cannot be applied due to an insoluble polymer fraction, soluble fraction/gel fraction or soluble fraction molecular weight after extraction from gel is used. An alternative to GPC used to quantify molecular weight is melt flow rate (MFR)—where higher molecular weight (MW) has a lower MFR, or melt viscosity (MV) measured at 100 sec-1, where higher MW resins show higher MV. By melt viscosity, an "extrusion" grade product would most frequently have a MV of between 12-30 kpoise at 100 sec-1 at 232° C. for PVDF polymers. An "injection molding" grade would have an MV of between 3-11 kpoise. For physical foaming the range of most interest is typically 17-28 kpoise at 100 sec-1 and Temp ° C.

Expandable Microspheres

The microspheres are small hollow particles with a polymer shell that can encapsulate various liquids or gases. The expandable microspheres of the invention are typically powders and can come in unexpanded or expanded forms. Upon heating, the polymer shell will soften and the liquid inside the sphere changes state to create a large volume of gas with high pressure—which will expand the microsphere substantially.

The spheres can have various diameters (typically with a wide size distribution), shell thickness, shell composition (typically lightly cross linked acrylates, methacrylates and their copolymers with acrylonitrile), and can contain various liquids or gases (typically, isooctane, isobutene, isopentane, or mixtures of thereof), such as Akzo Nobel Expancel® products and described for example in U.S. Pat. Nos. 3,615,972, 6,509,384 or 8,088,482. The microspheres can additionally contain finely dispersed organic or non-organic material both inside and on the surface. Microspheres are commercially available from several manufacturers in a wide range of particle size and distributions. Generally the microspheres have an average particle diameter of 10 to 140 micron, and more preferably 20 to 120 micron, with a shell thickness of several micron before expansion and average diameter of tens of micron with shell thickness of less than one micron after expansion are typical.

There are several processing advantages to forming a fluoropolymer foam with expandable microspheres: 1) There is less gas/polymer matrix interaction and thus concerns about the reduction of melt strength due to dissolved gas is reduced. 2) The compatibility of the blowing gas and polymer represented by its solubility, diffusivity and permeability are of much less concern. This allows one to decouple the cell initiation and growth phenomenon from polymer/gas compatibility. 3) The temperature profile for the extruder can be more similar to the temperature profile used with the neat polymer extrusion and the processing window is wider compared to the use of a gaseous blowing agent or a chemical blowing agent. 4) The bubbles formed by the expanding gas typically do not burst and coalesce into large voids, as can happen with gaseous physical blowing agents from both gas injected and chemical blowing agents. 5) The cell size distribution in the foam is a function of the particle size distribution of the microsphere particles. Thus, particular care should be given to the combination of the temperature and residence time of the process, since keeping the mixture at high temperature for long time would cause the gas inside the formed bubbles to escape from their thin shell into the polymer matrix where the bubbles would collapse. The control of temperature and residence time of the process is critical to forming a good closed foam. 6) Added nucleating agent is not necessary with the microspheres. The microsphere foaming of the invention can be used in a continuous or batch foaming process.

When the foamable microspheres have an acrylate-containing shell, dispersion by a melt process into a PVDF matrix is easier and more completely and uniformly dispersed, since acrylic polymers are at least partially miscible with PVDF in the melt. Miscibility can be shown by DSC data, as well as a transparent mixture. Insoluble or immiscible materials generally result in a two-phase morphology, and is typically opaque.

The choice of the particular microspheres for use in the composition will be determined based on the polymer matrix, processing temperature, viscosity, and the required cell size and structure. Any suitable percentage of microspheres in expanded or unexpanded form or a combination of both can be used in the formulation. Generally, the level of microspheres in the final foamed product ranges from 0.1 to 40 weight percent, preferably from 0.5 to 30 weight percent, and more preferably from 1 to 20 weight percent. A blend of two or more types of microspheres is contemplated in the invention, including two or more different average particle size microspheres, two or more different microsphere blowing agent chemistries, two or more different activation temperature, or a combination of several of these different microspheres.

Further, the use of the microsphere combined with a physical or chemical blowing agent is also contemplated.

There is a direct effect of foam microsphere loading on the density and other properties of the foam structures created. With the proper processing conditions obtained and a low level foam microsphere loading, one will see minimal bubble formation and smooth surface as the extrudate exits the die. With too high a level of foam microspheres the extrudate will over foam immediately, causing the melt strength to dramatically decrease and a rough surface finish will be generated. In foaming with microspheres, the bubble generation can occur inside the die which under unfavorable processing conditions would cause non-uniform, collapsed or ruptured cells on the surface or inside the articles. With the right amount of foaming concentrate and proper processing condition, a smooth surface with light textures is produced as material exits the die.

Masterbatch

While the microspheres and fluoropolymer matrix polymer can be combined directly, in one preferred embodiment the microspheres are combined with a polymer carrier for ease of handling—such as in producing a pellet that can be easily used in an extrusion process. The polymer carrier should have a melting point below the activation temperature of the foamable microsphere. Useful polymer carriers optimally should be compatible or miscible with the fluoropolymer matrix that will be foamed. Some useful carrier polymer include, but are not limited to ethylene vinyl acetate, acrylics, thermoplastic urethane (TPU), or other fluoropolymers with a low melting point, or a homopolymer or copolymer having a lower viscosity than the matrix fluoropolymer (PVDF) to which the masterbatch will be added. The masterbatch composition may be in any form, with a powder, paste, or a pellet being preferred. In addition to the microspheres and carrier polymer, other additives may be blended into the masterbatch. Additives useful in the masterbatch include, but are not limited to fillers, colorants or other additives. The invention also contemplates the use of two or more masterbatches, each containing different components, or different levels of the same components.

The level of foamable microspheres in the masterbatch ranges from 5% to 95%, preferably from 10% to 75%, and most preferable from 40% to 70%. The amount of this masterbatch used with the fluoropolymer matrix ranges from 0.01 to 90%, preferably from 0.05 to 30%, and most preferably from 0.1 to 15%.

Fluoropolymer

The fluoropolymers of the invention include, but are not limited to polymers containing at least 50 weight percent of one or more fluoromonomers. The term "fluoromonomer" as used according to the invention means a fluorinated and olefinically unsaturated monomer capable of undergoing free radical polymerization reaction. Suitable exemplary fluoromonomers for use according to the invention include, but are not limited to, vinylidene fluoride, vinyl fluoride, trifluoroethylene, tetrafluoroethylene (TFE), ethylene tetrafluoroethylene, and hexafluoropropylene (HFP) and their respected copolymers. Preferred fluoropolymers are a polyvinylidene fluoride homopolymer or copolymer, chlorotrifluoroethylene (CTFE), perfluorinated ethylene-propylene copolymer (EFEP), and polytetrafluoroethylene homopolymer or copolymers. Fluoro-terpolymers are also contemplated, including terpolymers such as those having tetrafluoroethylene, hexafluoropropene and vinylidene fluoride monomer units. Most preferably the fluoropolymer is a polyvinylidene fluoride (PVDF). The invention will be exemplified in terms of PVDF, but one of ordinary skill in the art will recognize that other fluoropolymers could be represented where the term PVDF is exemplified.

The polyvinylidene fluoride (PVDF) of the invention is PVDF homopolymer, copolymer or polymer alloy. Polyvinylidene fluoride polymers of the invention include the homopolymer made by polymerizing vinylidene fluoride (VDF), and copolymers, terpolymers and higher polymers of vinylidene fluoride, where the vinylidene fluoride units comprise greater than 51 percent, preferably 70 percent of the total weight of all the monomer units in the polymer, and more preferably, comprise greater than 75 percent of the total weight of the monomer units. Copolymers, terpolymers and higher polymers (generally referred to herein as "copolymers") of vinylidene fluoride may be made by reacting vinylidene fluoride with one or more monomers from the group consisting of vinyl fluoride, trifluoroethene, tetrafluoroethene, one or more of partly or fully fluorinated alpha-olefins such as 3,3,3-trifluoro-1-propene, 1,2,3,3,3-pentafluoropropene, 3,3,3,4,4-pentafluoro-1-butene, and hexafluoropropene, the partly fluorinated olefin hexafluoroisobutylene, perfluorinated vinyl ethers, such as perfluoromethyl vinyl ether, perfluoroethyl vinyl ether, perfluoro-n-propyl vinyl ether, and perfluoro-2-propoxypropyl vinyl ether, fluorinated dioxoles, such as perfluoro(1,3-dioxole) and perfluoro(2,2-dimethyl-1,3-dioxole), allylic, partly fluorinated allylic, or fluorinated allylic monomers, such as 2-hydroxyethyl allyl ether or 3-allyloxypropanediol, and ethene or propene. Preferred copolymers or terpolymers are formed with vinyl fluoride, trifluoroethene, tetrafluoroethene (TFE), and hexafluoropropene (HFP).

Preferred copolymers include those comprising from about 55 to about 99 weight percent VDF, and correspondingly from about 1 to about 45 weight percent HFP, and preferably a level of HFP of 2 to 30 weight percent; copolymers of VDF and CTFE; terpolymers of VDF/HFP/TFE; and copolymers of VDF and EFEP.

PVDF resins having a melt viscosity of from 0.01 to 55.0 Kpoise at 230° C. and 100 $S^{-1}$ could be used for this application. The preferred viscosity range is from 0.01 to 20.0 Kpoise and more preferably from 1.0 to 12.0 Kpoise.

The PVDF of the invention could also be an alloy of PVDF and a miscible, semi-miscible, or compatible polymer. Since most alloys of PVDF result in some diminishment of the PVDF properties, a preferred PVDF is one that is not an alloy. However, small amounts of other polymer, up to 25 percent of the total PVDF polymer alloy may be added. Other fluoropolymers (such as polyvinyl fluoride and PTFE), TPU and (meth)acrylic polymers are examples of useful polymers that may make up a useful polymer alloy.

Other Additives

While only fluoropolymer and foamable microspheres are needed for forming the foam of the invention, other additives could also be present—either in the masterbatch, in the matrix composition, or as a separate additive. Useful other additives include fillers, colorants or other additives. Nucleating agents may optionally be used in the composition, though a good foam can be formed without any nucleating agent.

Process

A fluoropolymer foam made with the microspheres of the invention may be formed in a continuous process or a non-continuous process A general continuous procedure for forming a foam using the foamable microspheres includes the following steps, with the preferred PVDF used to represent both PVDF and other fluoropolymers: a) optionally form a masterbatch of the microspheres in a carrier polymer; b) add the microspheres and the PVDF to an extruder, optionally with pre-blending; c) mix and process the microsphere/PVDF blend in the extruder; d) extrude a PVDF foam from the extruder; e) process and form the PVDF foam; f) cut the foam into final articles.

The formation of a masterbatch is a preferred, but optional, first step. One or more masterbatches contains the microspheres, a carrier polymer, and optional other additives are formed into a paste, powder or pellets, as described above.

The microspheres, alone or in the form of one or more masterbatches, are combined with the PVDF matrix polymer. The blending can involve a dry-blend or tumbling operation prior to being placed into the extruder, or the blending can occur in the extruder. It is key to add the proper amount of microspheres. The resultant mixture has low melt strength and different rheological behavior than the neat polymer. The reason is that typically the foam starts to form close to the end of the extruder and is well developed in the die before exiting. Surprisingly, this behavior is very different from chemical and physical blowing agent technologies in which the foam is formed after the composition exits the extruder through the die. The foaming inside the extruder could cause stability problems resulting in non-uniform, large and sometimes collapsed cells. Moreover, surface finish could be negatively affected if careful processing parameters are not chosen. The balance between generating enough heat in the extruder to melt the polymer and the appropriate residence time at that temperature to expand the microspheres is one of the most important aspects of making good foam. The temperature should be high enough to melt the polymer and activate the foaming agent. Moreover, the residence time of the polymer/foaming agent mix in the extruder should be long enough for activation of the major portion of the foaming agent and melting of the polymer. However, too long of residence time would result in leakage of the gas through the microsphere wall and therefore reduce the effectiveness of the foaming agent. Therefore, extruder, adaptor and die temperature profiles as well as line speed should be selected very carefully. The pressure at the end of the extruder, melt temperature and the die profile are also other important parameters to control. In the ideal situation, the maximum pressure that the melt experiences during the extrusion should be less than the partial pressure of the gas inside the microspheres at that temperature to prevent the collapse of the foam cells.

When using a twin screw extruder, in addition to the dry blend technique, metered feeding of the master batch and PVDF is also possible. Both single and twin screw extruders can be used for this process. In the single screw extruder, the residence time is controlled by the screw speed and the temperature is controlled by the external heating elements. The dispersion of the cells are sometimes accelerated through using mixing sections at the end of the extruder. However, if there is enough affinity between the polymer and microsphere shell, the dispersion can be achieved without the help of the mixing elements. In the case of the twin screw extruder, the residence time and distribution is controlled by screw design in addition to the screw speed. The temperature is controlled by the amount of shear and also the external heating elements. The use of twin screw extruder is especially beneficial for high density reductions due to the excellent mixing possibilities with this type of extruder. The temperature profile for the extruder should start from less than the melting temperature of the polymer in the first zone and gradually increase to the desired temperature based on the melting temperature of the PVDF and activation temperature of the foaming agent. Proper care should be taken not to increase the temperature too fast along the extruder as it might cause the premature activation of the foaming agent and cause leakage of the gas into the matrix and processing instabilities in the extruder. Typically, in a four zone extruder, the first zone is about 100° F. below the activation temperature of the foaming agent, the second zone is about 50° F. below, the third zone is at about 25° F. below the activation temp of the foaming agent and the fourth zone is at the activation temperature. PVDF foam products have been made on a range of machines including 1", 1.5", and 2.5" single screw extruders. PVDF foam has also been made using a range of screws including general purpose screws, barrier screw with Maddock mixing head, and barrier screw with Egan mixing head. A range of screws with L/D of 20:1 to 27:1, and compression ratios in a range from 3:1 to 4.5:1 has been used to make a variety of PVDF foam according to this invention teaching.

The PVDF foam exits the extruder through a suitably shaped die. The extrudate is partially or fully expanded prior to exiting the die. The cell expansion primarily occurs prior to exiting from the die although, in some cases residual expansion can occur after the foam exits the die, due to pressure relief. At this point if the temperature is not suitable, the gas will leak through the microsphere shell and escape from the extrudate surface causing increase of the foam density and collapse of reduction of the size of the cells. Preferably the foam expand less than 25 percent, more preferably less than 10 percent beyond the die gap size after extrusion.

In one embodiment, the expanded foam is self-supporting, and does not need a pipe or wire as support.

Following extrusion, the PVDF foam can be shaped and/or calendared to provide a smooth surface. The extruded foam can be shaped by many procedures including, for example, a three roll mill for forming sheet and films, calibrators for forming pipes and tubes, etc. The foam can also be laid or drawn-down on a carrier such as wire for wire jacketing or on a pipe for insulation purposes. An important characteristic of this foam is that it can provide free standing extrudates without the need to be necessarily laid down on a pipe or wire carrier due to its high melt strength.

The calibrator, as used herein, could be any device that would cool down, shape, form, prevent from collapse or brings to the size the PVDF foam. Examples for these calibrators for pipe and tubes could be sizing or vacuum tanks with or without the sizer rings, with or without the water or water spray, with or without vacuum or combination of the above factors. The calibrator for the foam PVDF film and sheet could be a two or three roll stack with or without calendaring. The calibrator for the corrugated pipe could be one of the various types of the corrugator machines. As the result of going through the calibrator the foamed part would have a smooth surface finish, and the mechanical and permeation properties would be increased. In one embodiment, when the end use is for pipe and tube production, the foamed melt would go through a shaping device which is typically attached to the inside of the cooling tank, while vacuum is being pulled on the surface of the water in the tank. It was found that a 15 foot long tank with 32° C. water temperature at 10-20 water vacuum was sufficient for forming most hollow articles. In one embodiment, a preferred sizer in the tank is constructed from brass plates with a length between 0.75"-3.5". The distance between these plates could be varied to fit the characteristics of the product being made.

A non-continuous process could involve an injection molding, in which the microsphere/fluoropolymer mixture is extruded into molds, the molds released to provide a molded foam article or part. A rotomolding process could also be used as a non-continuous process for producing foamed articles of the invention.

The foam could be used in a multilayered construction with the foam layer comprising one or more layers in a desired construction. The foam layer could be used on an outside layer when some texture is desired or within the mulitlayerd construction when smooth outside surfaces are desired. The multilayer construction could use any technology known to date including coextrusion and tandem extrusion.

In one embodiment, a post-foaming process can be used to fully expand microspheres that are not fully expanded, thus reducing the foam density even further.

Properties

A key property of the foamed product of the invention is a significant reduction in density. By "low-density" foam, as used herein, is meant a foam having a density of less than 90 percent of the unfoamed fluoropolymer, preferably less than 75 percent the density of the unfoamed fluoropolymer, and more preferably less than 50 percent the density of the unfoamed fluoropolymer. In one embodiment, the fluoropolymer foam is less than 35 percent the density of the unfoamed fluoropolymer, and even less than 25 percent the density of the unfoamed fluoropolymer.

While solid PVDF has a density of about 1.78 g/cm$^3$, the foamed PVDF of the invention could have a density allowing it to float on water and solvents. This low density, combined with the excellent chemical and oxidation resistance of PVDF make the PVDF foam useful as an evaporation and/or splash shield on the surface of corrosive liquids, as shown in US 2016/0101932.

An article having a 40 percent reduction, and even a 50 percent reduction in density would still provide load bearing properties, at a much reduced weight and material savings. Articles with such a density reduction could be used for example as pipes that can hold pressure, or rods or profiles that can carry loads. These articles are typically joined together or attached to standard couplings or fittings and can be manufactured with a tight tolerance. For example, 4" schedule 40 pipes have an outside diameter of 4.500" with a tolerance of +/−0.009" and a thickness of 0.251" with a tolerance of +/−0.016". The foamed PVDF of this invention has the melt strength to undergo calibration, allowing one to form and size an article to these close tolerances.

The foam of the invention is has excellent thermal conductivity resistance, making it useful as an insulating material. For example, the thermal conductivity of a 150 mil thick PVDF copolymer foam having an 80% density reduction at 75° C. was measured at 0.29 BTU in/hr·ft$^2$, making it a B3 material.

Another advantage of the foamed articles of the invention is their increased flexibility. The flexural modulus is reduced as the level of foaming is increased, as shown in Table 5 of the Examples. Solid PVDF pipes or sheet that could not be put on a reel would be flexible enough in foamed form to be reeled. In some instances, cutting high modulus PVDF parts would cause micro cracks. It has been shown that foaming PVDF would have clean cuts without any micro crack.

In another embodiment of this invention, the foam concentrate is used to produce lower levels of density reduction in order to adjust "tune" an important property. For these applications, lower levels of density reduction in the range of 1 to 40% density to achieve a desired property. The ability for this technology to consistently produce a targeted density reduction allows for it to be used to adjust a desired property. In one case, the foam is added at relatively low levels that enhance stripability while still maintaining most of the properties associated with the solid polymer. This could be useful for applications in oil and gas where stripping of the encapsulation is a known problem. More specifically, the encapsulation layers used for tube encapsulated cables (TEC Cables) are known to be difficult to strip in the field. TEC cables are installed in areas where heating to soften the encapsulation to improve stripping cannot be used. The addition of a small amount of foam concentrate will greatly improve stripability with target values low enough not to significantly affect other physical properties.

In another case, a cable is being produced where "the feel" of the cable is considered important. For many customers, a flexible and "damp" feeling to the product when flexed is considered important. It is an arbitrary but real condition that relies on the perceived needs of the customer. In many cases, cables of equivalent performance and price can be differentiated by feel with value placed on feel. The ability to adjust the flexural modulus of the outer jacket with low level foam addition could be a useful and valuable solution to such issues.

Another key unexpected property of the PVDF foam of the invention is that it is flame retardant. This is unexpected, given that the microspheres contain a flammable liquid, which remains within the closed cell fluoropolymer foam.

Thin foam films, made by the process of the invention would have translucency, making them useful in optical applications.

Uses

Given the low density, lower weight, and flexibility of the PVDF closed cell foam, and the chemical, UV, heat, and flame resistance of PVDF, the foam of the invention could be used in many applications where light weight, and/or heat and sound insulation are important. Important industry segments where the PVDF foam is useful includes, but is not limited to, oil & gas, wire and cable, aerospace, transportation, chemical manufacturing, building and construction, beverage, medical, pharmaceutical and cosmetics industries. PVDF foam articles include single and multi-layer films, pipes and tubes.

The continuous extrusion of PVDF foam and the ability to form articles with close tolerances through calibration devices, leads to many possible useful articles, including but not limited to:

light-weight, flame resistant insulation for aerospace, trains, ships, and cars, jackets and sub-unit jackets for fiber optic cables, jackets and insulation for communication and power cables, jackets for tube encapsulated cables (TEC)

microduct conduit, plenum conduits.

chemical manufacturing tubing, piping and insulation, building and construction insulation or part of composite panels especially where high heat or flame resistance is needed gaskets and seals, thin foamed tough film that could compete other tough polymers for outdoor coverings and fire-resistant insulation, chemical and flame-resistant tapes, floating devices sound insulation thermoformed articles for structural applications

EXAMPLES

The foaming concentrate used in these examples contains 65% microspheres in EVA carrier. The expanded average particle size of the product before expansion is 120 microns. Activation of this product is expected to start around 160° C. with the maximum expansion achieved by 210° C.

Example 1—Tubes

Foam tubes from KYNAR PVDF 3120-10 resin with a viscosity of 10 Kpoise at 450° F. and $100^{-1}$ S and KYNAR PVDF 3120-50 resin with a viscosity of 25 Kpoise at 450° F. and $100^{-1}$ S were made on a 1.5" single screw extruder with 24 L/D Barrier screw and Maddox mixing. The 0.50 inch diameter tubing with 0.060 inch wall thickness was made using a two-leg spider die. The pin and die was attached to the die, with a port to allow airflow through the spider leg into the center of the tube. The pin and die were 4.350 inches long with a base diameter of 1.150 inches for pin and 1.750 inches for the die. The land length was 1.200.inches. This combination of pin and die produced a draw balance of 1.1 and a draw down ratio of 0.997.

For 0.50 inch tubing a plate sizer of 0.390 inches with four brass sizing plates having a 0.060 inch gap between plates and a total height of 0.905 inches was used. The opening of the sizer has a 0.125 inch radius machined around the circumference. The sizer was over sized to compensate for the shrinkage.

A 10 foot two stage water vacuum cooling tank was used with the water temperature controlled at 90° F. The two-belt puller was set to a line speed of 9.6 ft/min to pull the material.

Tables 1 and 2 provide the processing conditions, masterbatch loading and percentage density reductions. Concentrate loading varied from 2.5% to 6% and was dry blended in pellet form with KYNAR resin before extrusion.

TABLE # 1

Tubes made using KYNAR 3120-10 Pellets

| Zone 1 (° F.) | Zone 2 (° F.) | Zone 3 (° F.) | Clamp (° F.) | Adapter (° F.) | Die Zone 1 (° F.) | Die Zone 2 (° F.) | RPM | Melt Pressure (psi) | WEIGHT REDUCTION (%) | FOAM CONCENTRATE LOADING (%) |
|---|---|---|---|---|---|---|---|---|---|---|
| 360 | 380 | 430 | 400 | 350 | 370 | 370 | 15.0 | 490 | 71.4 | 6 |
| 360 | 380 | 430 | 400 | 360 | 370 | 370 | 15.0 | 560 | 58.2 | 3 |

TABLE # 2

Tubes made using KYNAR3120-50 Pellets

| Zone 1 (° F.) | Zone 2 (° F.) | Zone 3 (° F.) | Clamp (° F.) | Adapter (° F.) | Die Zone 1 (° F.) | Die Zone 2 (° F.) | RPM | Melt Pressure (psi) | WEIGHT REDUCTION (%) | FOAM CONCENTRATE LOADING (%) |
|---|---|---|---|---|---|---|---|---|---|---|
| 360 | 380 | 430 | 400 | 390 | 390 | 390 | 15.0 | 480 | 73.7 | 6 |
| 360 | 380 | 430 | 400 | 400 | 400 | 400 | 15.0 | 480 | 72.5 | 6 |
| 360 | 380 | 430 | 400 | 400 | 400 | 400 | 25.0 | 610 | 72.4 | 6 |
| 360 | 380 | 430 | 400 | 370 | 370 | 370 | 25.0 | 690 | 71.6 | 6 |
| 360 | 380 | 430 | 400 | 370 | 370 | 370 | 20.0 | 700 | 65 | 5 |
| 360 | 380 | 430 | 400 | 370 | 370 | 370 | 20.0 | 780 | 54 | 2.5 |
| 360 | 380 | 430 | 400 | 370 | 400 | 400 | 20.0 | 700 | 56 | 2.5 |

In a separate run using the same line and conditions, a tube with the following composition was run:

50% KYNAR UHM 6020-20

42% KYNAR 705

8% Foam Concentrate

KYNAR UHM contains 20% glass fiber. Therefore, the glass fiber content in the final product was 10%. The resulting tube had a density reduction of 60%, good surface finish and high stiffness.

Example 2—Sheet

KYNAR PVDF foam sheets were made on a 1.250" diameter 24:1 L/D single screw extruder with spiral Maddox mixer. The sheet was extruded through a coat hanger die, with 12 inch width, 1" die lip land length. The lip gap was set to roughly 0.200". The foam sheet was 10" to 11" wide and 0.050 to 0.160 inches thick. Calendared and non-calendared sheets were produced using a three-roll stack with chrome polished rolls and was rolled up downstream with a winder. Concentrate loading varied from 2.5 to 6 percent and was dry blended with KYNAR 3120-10 and KYNAR 705 with a viscosity of 2-4 Kpoise at 450° F. and $100^{-1}$ S pellets before extrusion.

Below are the loading of the foaming agent, processing conditions and corresponding density reductions:

TABLE 3

KYNAR 705 Processing Conditions

| Density Reduction | 64% | 63% | 75% | 85% | 68% | 88% |
|---|---|---|---|---|---|---|
| Foam Concentrate (%) | 4 | 6 | 6 | 10 | 6 | 15 |
| Barrel 1° C. | 180 | 180 | 180 | 180 | 180 | 180 |
| Barrel 2° C. | 180 | 180 | 180 | 180 | 180 | 180 |
| Barrel 3° C. | 210 | 210 | 210 | 210 | 210 | 210 |
| Clamp | 205 | 205 | 205 | 205 | 205 | 205 |
| Adapter | 205 | 205 | 200 | 200 | 205 | 205 |
| Die 1° C. | 205 | 205 | 210 | 200 | 205 | 205 |
| Die 2° C. {Center} | 190 | 190 | 215 | 215 | 190 | 190 |
| Die 3° C. | 205 | 205 | 210 | 210 | 205 | 205 |
| Die 4° C. | 205 | 205 | 210 | 210 | 205 | 205 |
| Die 5° C. {Center} | 190 | 190 | 215 | 215 | 190 | 190 |
| Die 6° C. | 205 | 205 | 210 | 210 | 205 | 205 |
| RPM | 45 | 75 | 85 | 85 | 75 | 99 |
| Motor Load % | 35 | 30 | 30 | 30 | 30 | 34 |
| Melt Pressure (PSI) | 280 | 360 | 350 | 340 | 360 | 590 |
| Thickness (mil) | 0.050 | 0.150 | 0.13 | 0.120 | 0.150 | 0.140 |
| Roll Speed | 1.5 | 1.2 | 2.8 | 3.2 | 1.2 | 3.7 |
| Calendar | Non | yes | yes | yes | Non | yes |

TABLE 4

KYNAR 3120-10 Processing Conditions

| Density Reduction | 63% | 68% | 82% | 82% | 84% |
|---|---|---|---|---|---|
| Foam Concentrate (%) | 4 | 6 | 10 | 10 | 15 |
| Barrel 1 ° C. | 180 | 180 | 180 | 180 | 180 |
| Barrel 2 ° C. | 180 | 180 | 190 | 190 | 190 |
| Barrel 3 ° C. | 210 | 210 | 210 | 210 | 210 |
| Clamp | 205 | 205 | 210 | 210 | 210 |
| Adapter | 205 | 205 | 205 | 205 | 205 |
| Die 1 ° C. | 205 | 205 | 205 | 205 | 205 |
| Die 2 ° C. {Center} | 190 | 190 | 190 | 190 | 190 |
| Die 3 ° C. | 205 | 205 | 205 | 205 | 205 |
| Die 4 ° C. | 205 | 205 | 205 | 205 | 205 |
| Die 5 ° C. {CENTER} | 190 | 190 | 190 | 190 | 190 |
| Die 6 ° C. | 205 | 205 | 205 | 205 | 205 |
| RPM | 75 | 75 | 75 | 75 | 75 |
| Motor Load % | 35 | 30 | 34 | 34 | 34 |
| Melt Pressure (PSI) | 640 | 530 | 590 | 590 | 590 |
| Thickness (mil) | 0.150 | 0.150 | 0.140 | 0.160 | 0.120 |
| Roll Speed 1 | 1.2 | 1.2 | 2.2 | 2.1 | 2.5 |

TABLE 5

Physical Test Results for Foam Sheets - Specimens were Die cut and tested per ASTM D638

| Samples | Tensile Stress at Yield (psi) | Tensile Strain at Yield (%) | Tensile Stress at Break (psi) | Tensile Strain at Break (%) | Flex Modulus (psi) |
|---|---|---|---|---|---|
| KYNAR 705 Control | 7574 | 7.4 | 4432 | 38.3 | 319519 |
| KYNAR 705 45% Density Reduction | 2132 | 8.1 | 2067 | 8.4 | 104358 |
| KYNAR 705 55% Density Reduction | 1929 | 11.3 | 1897 | 14.8 | 101363 |
| KYNAR 705 83% Density Reduction | NA | NA | 351 | 6.1 | 14139 |
| KYNAR 3120-10 Control | 3851 | 16.7 | 4635 | 530 | 116475 |
| KYNAR 3120-10 50% Density Reduction | 1165 | 78.2 | 1140 | 82.9 | 49710 |
| KYNAR 3120-10 60% Density Reduction | 1134 | 9.1 | 1068 | 45.1 | 45101 |
| KYNAR 3120-10 70% Density Reduction | 646 | 8.5 | 642 | 94.7 | 28434 |
| KYNAR 3120-10 80% Density Reduction | 439 | 8.4 | 399 | 48.3 | 15527 |

Sheets made from KYNAR 3120-10 with 70 percent density reduction and KYNAR 705 with 83 percent density reduction and about 100 mil thickness were successfully thermoformed into a cup with 3.5 inch diameter and 1.25 inch depth. The parts had good surface finish, no tears and crisp sharp corners. Sheets were heated at 355° F. for 40 and 45 seconds before forming.

Example 3—Film

KYNAR PVDF foam films were made on a 1¼" diameter 24:1 L/D single screw extruder with spiral Maddox mixer. The film was extruded through a coat hanger die, with 12" width, 1" die lip land length. The lip gap was set to 0.060. The foam film was 10 to 11 inches wide and 0.025 to 0.050 inches thick. Films were calendared through a three-roll stack with chrome polished rolls and then rolled up downstream with a winder. Below are the processing conditions. Concentration loading varied from 2 to 4 percent. The concentrate was mixed in pellet form with the KYNAR 3120-50 resin.

TABLE 6

3120-50 Processing conditions

| Material | KYNAR 3120-50 | KYNAR 3120-50 |
|---|---|---|
| Weight Reduction | 47% | 63% |
| Foam Concentrate (%) | 2 | 4 |
| Barrel 1 ° C. | 180 | 180 |
| Barrel 2 ° C. | 195 | 195 |
| Barrel 3 ° C. | 220 | 220 |
| Clamp | 200 | 200 |
| Adapter | 200 | 200 |
| Die 1 ° C. | 200 | 200 |
| Die 2 ° C. {Center} | 200 | 200 |
| Die 3 ° C. | 195 | 195 |
| Die 4 ° C. | 195 | 195 |
| Die 5 ° C. {CENTER} | 200 | 200 |
| Die 6 ° C. | 200 | 200 |
| RPM | 30 | 65 |
| Motor Load % | 34 | 91 |
| Melt Pressure (PSI) | 890 | 1070 |
| Thickness (mil) | 25 | 50 |
| Roll Speed 1 | 2 | 2 |

Example 4—Wire Jacketing

Wire jacketing was made on a 1¼ inch diameter 24:1 L/D single screw extruder with spiral Maddox mixer and a B&H cross head die. The wire is fed through the center of the die and coated with the KYNAR foam. The jacketed wire is then pulled by a puller/winder through a water tank to solidify and then is spooled and collected on a reel. Draw down ratio varied 3-7% depending on the tooling selected. The jacket thickness was in the 0.020" to 0.025" ranges. KYNAR 3120-10 resin was used as the base resin. The distance between the die and tank was roughly 7 inches.

The processing conditions and tooling sizes are shown in the tables below.

TABLE 7

Wire line conditions- 0.340 Die & 0.220 Pin

| Zone 1 (° F.) | Zone 2 (° F.) | Zone 3 (° F.) | Clamp (° F.) | Adapter (° F.) | Die Zone 1 (° F.) | Die Zone 2 (° F.) | RPM | Melt Pressure (psi) | LINE SPEED FT/MIN |
|---|---|---|---|---|---|---|---|---|---|
| 360 | 380 | 430 | 400 | 400 | 400 | 400 | 30.0 | 1600 | 30 |

TABLE 8

Wire line conditions- 0.317 Die & 0.220 Pin

| Zone 1 (° F.) | Zone 2 (° F.) | Zone 3 (° F.) | Clamp (° F.) | Adapter (° F.) | Die Zone 1 (° F.) | Die Zone 2 (° F.) | RPM | Melt Pressure (psi) | LINE SPEED FT/MIN |
|---|---|---|---|---|---|---|---|---|---|
| 360 | 380 | 430 | 400 | 400 | 400 | 400 | 30.0 | 2300 | 30 |
| 360 | 380 | 430 | 400 | 400 | 400 | 400 | 30.0 | 2800 | 30 |

Results:

TABLE 9

Loading Vs Weight Reduction

| Material | Foam Concentrate Loading | Weight Reduction |
|---|---|---|
| KYNAR 3120-10 | 2% | 59.2% |
| KYNAR 3120-10 | 1% | 42.2% |
| KYNAR 3120-10 | 0.5% | 27.9% |
| 50% KYNAR 3120-10 & KYNAR 50% 3120-50 blend | 1.5% | 50% |

Example 5—Burn Tests

Samples of KYNAR 3120-15 sheets were produced using the method described in example 2 above. The thickness of the sheet was 150 mils and the density reduction was 70%. Samples were submitted for the following burn tests:
1) FAR 25.853(a) Appendix F, Part I, (a),1,(i):60 seconds which is a timed vertical burn test. Samples passed this test with a wide margin.
2) FAR 25.853(d) Appendix F, Part IV which is also known as Ohio State University Heat Release Test (OSU). The requirements are 65/65 for HR/HRR and samples passed with 44/60.
3) FAR 25.853 (d) Appendix F, Part V which is a smoke density test with an average 4 minute limit of 200 and samples passed with a value of 58.

Three sets of specimen of 4 pair conductors with PVC primary covering wrapped in PVC, solid KYNAR 3120-15 and foamed KYNAR 3120-15 with 60% density reduction were produced and submitted for NFPA 262, 2011 Edition, Standard Method of Test for Flame Travel and Smoke of Wires and Cables for Use in Air Handling Spaces. The samples were measured 0.2" in diameter. Following table shows the results:

TABLE 10

| Primary | Jacket | Flame Spread (ft) | Average Smoke | Peak Smoke |
|---|---|---|---|---|
| FR-PVC | FR-PVC | 2.2 | 0.068 | 0.47 |
| FR-PVC | Solid KYNAR resin | 0 | 0.043 | 0.31 |

TABLE 10-continued

| Primary | Jacket | Flame Spread (ft) | Average Smoke | Peak Smoke |
|---|---|---|---|---|
| FR-PVC | Foam KYNAR resin | 0 | 0.037 | 0.34 |
| Passing Requirement | | 5 | 0.15 | 0.5 |

Clearly performance of KYNAR resin jacketing is superior to PVC jacketing and performance of foamed KYNAR resin jacket is very similar to solid KYNAR jacket.

Tube samples with 0.48" OD and 0.35 ID were produced from KYNAR 3120-15 with 65% density reduction using method described in example 1. Samples were submitted for UL 2024: Optical Fiber and Communication Cable Raceway. Following table shows the results of this test:

TABLE 11

| | Flame Spread (ft) | Average Smoke | Peak Smoke |
|---|---|---|---|
| KYNAR Foam Tubes | 0 | 0 | 0.001 |
| Passing Requirement | 5 | 0.15 | 0.5 |

Samples have superior flame and smoke properties.

Example 6—Thermal Insulation

Samples of KYNAR 3120-15 with 1" thickness were made and submitted for thermal conductivity test. Following table shows the result for this test:

TABLE 12

| Thermal Conductivity | °F. | 17.6 | 32.0 | 50.0 | 75.2 | 104.0 |
|---|---|---|---|---|---|---|
| | Btu·In/hr·ft²·°F. | 0.3973 | 0.4043 | 0.4081 | 0.4121 | 0.4092 |
| | W/mK | 0.0572 | 0.0582 | 0.0582 | 0.0593 | 0.0589 |

For reference thermal conductivity of solid KYNAR resin is about 1.125 Btu·In/hr·ft²·°F. Based on these results This KYNAR foam has an R value of almost 2.5 Btu/hr·ft²·°F.

Example 7—Chemical Resistance

This month we finished a chemical resistance test of KYNAR low density foam in several harsh chemicals. Following table shows the results for a 150 mil thick 3120-15 foam sheet with 65% density reduction exposed to several harsh chemicals at room temperature and 40° C. for 30 days:

| Chemical | Temp °C. | Yield Stress (psi) | Yield @ Elongation (%) | Stress @ Break (psi) | Elongation @ Break (%) | Weight Gain (%) |
|---|---|---|---|---|---|---|
| Control | RT | 939 | 32 | 968 | 50.6 | |
| Hydrogen Peroxide (30%) | RT | 918 | 30.5 | 933 | 60.6 | 0.47% |
| | 40 C. | 741 | 28.3 | 796 | 45.2 | 0.69% |
| Sulfuric Acid (95%) | RT | 762 | 40.6 | 804 | 56.6 | 2.22% |
| | 40 C | 834 | 33.0 | 822 | 56.1 | 3.75% |
| Fuel CE 10 | RT | 890 | 31.2 | 866 | 51.6 | 1.44% |
| | 40 C. | 814 | 51.3 | 855 | 48.3 | 6.28% |
| Fuel C | RT | 767 | 33.2 | 770 | 48.6 | 1.06% |
| | 40 C. | 829 | 41.8 | 843 | 67.1 | 2.95% |
| Hydrochloric Acid (37%) | RT | 946 | 39.7 | 873 | 53.6 | 2.63% |
| | 40 C. | 901 | 33.5 | 881 | 47.8 | 4.54% |
| Nitric Acid (70%) | RT | 915 | 45.1 | 862 | 56.8 | 6.20% |
| | 40 C. | 803 | 36.3 | 799 | 57.2 | 10.78% |
| Ammonium Hydroxide (28%) | RT | 743 | 50.3 | 741 | 56.5 | 3.83% |
| | 40 C. | 739 | 32.8 | 778 | 56.9 | 6.27% |

Example 8—Thermoforming Foamed Sheets

We thermoformed a 3.375" diameter and 1.25" deep cup using a KYNAR 3120-10 sheet with a 65% density reduction. The sheet thickness was 140 mils and we used a MACC Electric 30"×36 single station thermoforming machine. The conditions are summarizes in this table:

| Conditions For 3.375" Cup | |
|---|---|
| Sample Mold Size | Single Cavity - 3.375 Diameter by 1.250 Deep |
| Sample Size | 12" × 12" by 0.140" Thickness |
| Material | KYNAR 3120-10 |
| Density Reduction | 65% |
| Oven Preheat Temperature | 350° F. |
| Eject Time/ Temperatures | Sample was removed from Oven when the inferred sensor- reads a surface temperature of 325° F. |
| Vacuum Time | 5 Seconds |
| Cooling -Air cooled Fan | 30 Seconds |

FIG. 1 shows a picture of the thermoformed cup. The part draws very nicely without any ruptures, fills the cavity and has sharp edges.

We also thermoformed a 30 mil KYNAR 710 based foam sheet with a density reduction of 55% using the same equipment mentioned above. The mold for this part was specifically designed and ordered for KYNAR 700 with the potential use in honeycomb type structure. The conditions are shown in the table below.

| Conditions For Multi Cavity -Egg Grate | |
|---|---|
| Sample Mold Size | Multi Cavity - 36 cavity Equally Spaced 6 rows length by 6 rows wide on 0.800 centers 0.625 Diameter by 0.150 Deep |
| Sample Size | 12" × 18" by 0.030" Thickness |
| Material | KYNAR 710 |
| Density Reduction | 55% |
| Oven Preheat Temperature | 350° F |
| Eject Time/ Temperatures | Sample was removed from Oven when the inferred sensor reads surface temperature of 320° F. |
| Vacuum Time | 5 Seconds |
| Cooling -Air cooled Fan | 30 Seconds |

Figure 2:
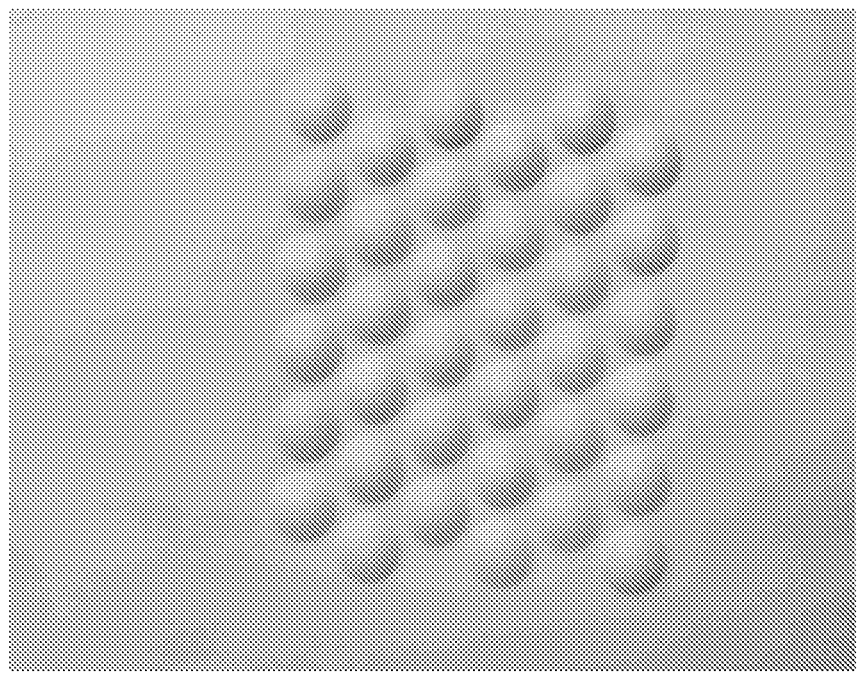
FIG. 2 Shows a thermoformed foam sample made of the foam of the invention.

FIG. 2 shows the thermoformed sample. As you can see, there is no rupture and the sizes are very uniform.

Sheets used in this example were produced using methods described in example 2 above.

What is claimed is:

1. A fluoropolymer foam structure comprising:
   polyvinylidene fluoride (PVDF) polymer;
   0.1 to 30 weight percent of microspheres, and
   a carrier resin, wherein said carrier resin is compatible with the PVDF polymer, wherein the carrier resin is selected from the group consisting of ethylene vinyl acetate, acrylics, thermoplastic urethane (TPU), and a fluoropolymer with a low melting point or a lower viscosity than the polyvinylidene fluoride (PVDF) polymer,
   wherein said microspheres have an acrylate containing shell that is compatible with said PVDF polymer and wherein said PVDF polymer has a melt viscosity of from 0.01 to 55 Kpoise at 100 sec$^{-1}$ and 232° C.).

2. The fluoropolymer foam structure of claim 1, wherein said PVDF polymer comprises at least 51 weight percent of vinylidene fluoride monomer units.

3. The fluoropolymer foam structure of claim 1, wherein said foam comprises from 0.1 to 20 weight percent of said microspheres.

4. The fluoropolymer foam structure of claim 1, further comprising one or more additives selected from the group consisting of impact modifiers, UV stabilizers, plasticizers, fillers, coloring agents, pigments, dyes, antioxidants, antistatic agents, surfactants, toner, pigments, and dispersing aids, char formers, and flame retardants.

5. The fluoropolymer foam structure of claim 1, wherein said PVDF polymer is a polyvinylidene fluoride copolymer having at least 70 weight percent of vinylidene fluoride monomer units and 0.1 to 30 weight percent of fluoromonomers units selected from the group consisting of vinyl fluoride, trifluoroethene, tetrafluoroethene, one or more of partly or fully fluorinated alpha-olefins, 3,3,3-trifluoro-1-propene, 1,2,3,3,3-pentafluoropropene, 3,3,3,4,4-pentafluoro-1-butene, and hexafluoropropene, hexafluoroisobutylene, perfluorinated vinyl ethers, perfluoromethyl vinyl ether, perfluoroethyl vinyl ether, perfluoro-n-propyl vinyl ether, perfluoro-2-propoxypropyl vinyl ether, fluorinated, perfluoro(1,3-dioxole), perfluoro(2,2-dimethyl-1,3-dioxole), and fluorinated or partly fluorinated allylic monomers.

6. The fluoropolymer foam structure of claim 1, wherein said fluoropolymer is foamed and the density of the fluoropolymer foam is 75 percent less than the density of the PVDF polymer prior to being foamed.

7. The fluoropolymer foam structure of claim 1, wherein said PVDF polymer is foamed and the density of the foamed PVDF polymer is 1 to 25% less than the density of the PVDF polymer prior to being foamed.

8. A masterbatch for use in producing a fluoropolymer foam, wherein said masterbatch comprises 5 to 95 weight percent of a carrier resin, wherein said carrier resin is compatible with the PVDF polymer of claim 1.

9. The masterbatch of claim 8, wherein said carrier resin is a polyvinylidene fluoride homopolymer or copolymer having a lower melt viscosity that is at least a factor or 5 times lower than the melt viscosity of the polyvinylidene fluoride matrix polymer to which it will be added, when measured at 232° C. and 100 $sec^{-1}$, as measured by capillary rheometry.

10. The fluoropolymer foam structure of claim 1, wherein said structure is selected from the group consisting of: flame resistant insulation, jacketing for fiber optics, jacketing for wire and cable applications, encapsulation, filler, microduct conduit, plenum conduits, chemical manufacturing equipment, tubing, piping, building and construction, gaskets, seals, thin foamed tough film, and chemical and flame-resistant tapes.

11. The fluoropolymer foam structure of claim 10, wherein said structure is a component on a cable and has improved stripability from introduction of the foam.

12. The fluoropolymer foam structure of claim 10, wherein said fluoropolymer has been crosslinked.

* * * * *